Feb. 24, 1953     E. L. HARDER ET AL     2,629,853
REGULATING SYSTEM
Filed Dec. 22, 1951     2 SHEETS—SHEET 1
Fig.I.
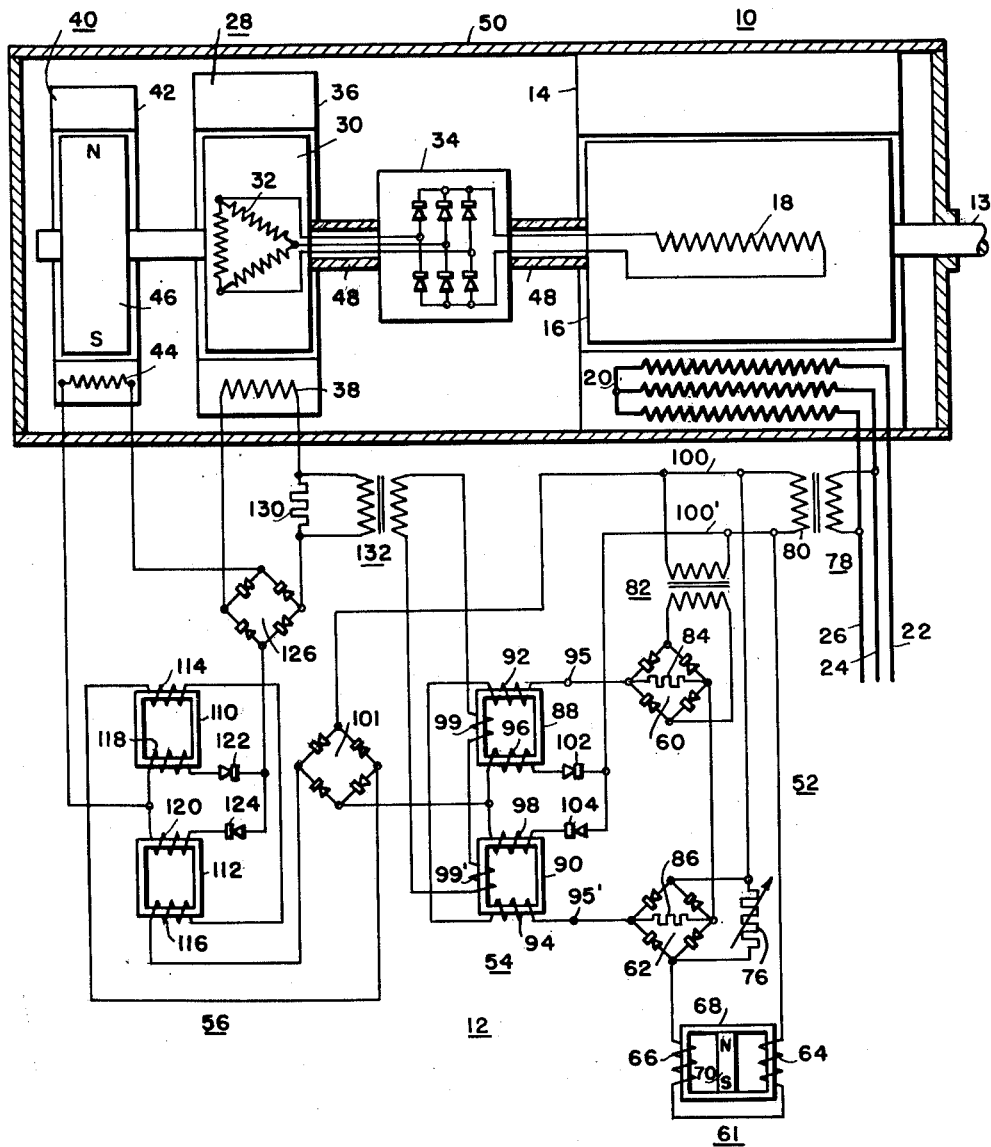
WITNESSES:
E.A. M?Clatey
K.H. Thomas
INVENTORS
Edwin L. Harder and
Schuyler L. Bradley.
BY
Ezra W. Savage
ATTORNEY

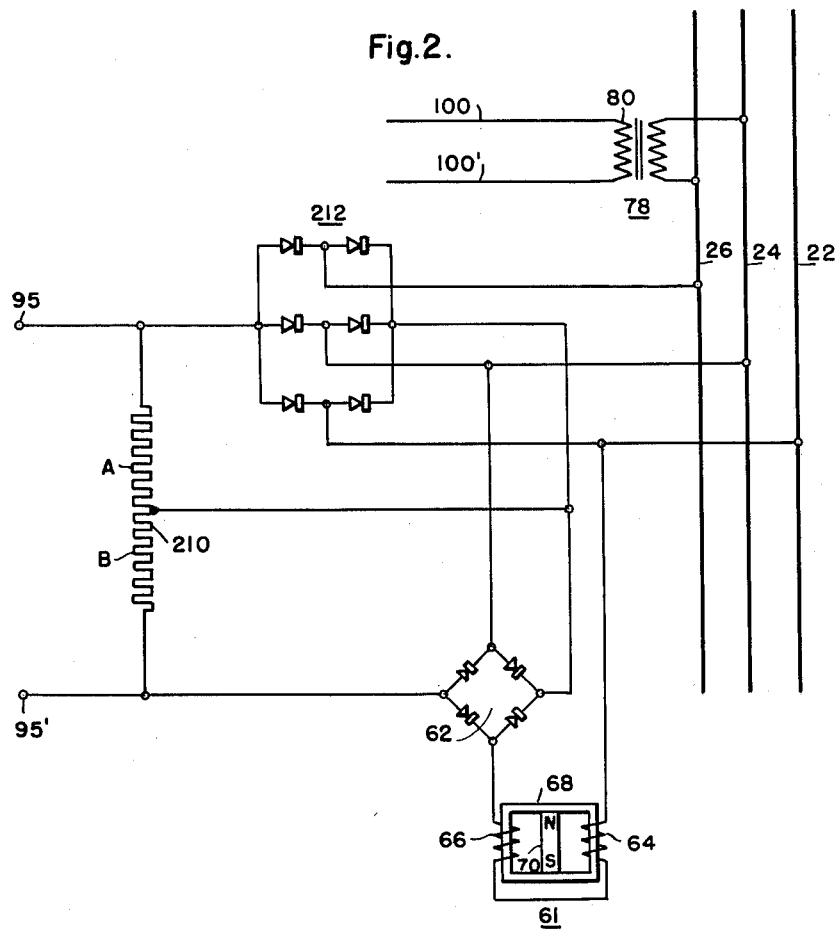

Patented Feb. 24, 1953

2,629,853

UNITED STATES PATENT OFFICE 2,629,853

REGULATING SYSTEM

Edwin L. Harder and Schuyler L. Bradley, Pittsburgh, Pa., assignors to Westinghouse Electric Corporation, East Pittsburgh, Pa., a corporation of Pennsylvania Application December 22, 1951, Serial No. 262,971

10 Claims. (Cl. 322—28)

This invention relates to regulating systems and in particular to regulating systems utilizing a voltage reference network.

Regulating systems comprising a voltage reference network have heretofore been utilized for maintaining the output voltage of an alternating current generator substantially constant. However, these prior art voltage reference networks are sensitive to changes in frequency and temperature unless some special compensating means are provided to make the necessary corrections. The output polarities of such voltage reference networks are also affected by a high transient input current unless an elaborate and expensive positive sequence network is provided to offset the effects of the high transient input current.

An object of this invention is to provide a new and improved voltage reference network, comprising a saturable reactor, by providing an absolutely constant bias for the saturable reactor so as to produce an output from the voltage reference network that is substantially unaffected by changes in the frequency and magnitude of the input voltage applied thereto.

Another object of this invention is to provide, in a regulating system for maintaining an electrical quantity substantially constant a new and improved voltage reference network, comprising a saturable reactor, by providing an absolutely constant bias for the saturable reactor so as to produce an output from the voltage reference network that is substantially unaffected by changes in the frequency and magnitude of the input voltage applied thereto.

A further object of this invention is to provide a voltage reference network that is insensitive to high transient input current by having a portion of its input responsive to variable three-phase energy and passing the variable three phase energy once it has been rectified to the output of the voltage reference network.

Still another object of this invention is to provide, in a regulating system for maintaining an electrical quantity substantially constant, a voltage reference network that is insensitive to a high transient input current by having a portion of its input responsive to variable three-phase energy and passing the three-phase energy once it has been rectified to the output of the voltage reference network.

A still further object of this invention is to provide a fast responding stable regulating system for an alternating current generator having a brushless excitation system, by supplying a magnetic amplifier which is responsive to the output of the generator with high frequency alternating current energy.

Other objects of this invention will become apparent from the following description when taken in conjunction with the accompanying drawing, in which:

Figure 1 is a schematic diagram of circuits and apparatus of an embodiment of the teachings of this invention, and Fig. 2 is a schematic diagram of circuits and apparatus of another embodiment of the teachings of this invention.

Referring to Fig. 1 of the drawing, there is illustrated a turbo-generator 10 whose output voltage is maintained substantially constant by means of a regulating system, which is represented generally at 12. The turbo-generator 10 receives its driving power from a prime mover (not shown) through a shaft 13. The turbo-generator 10 comprises a stator member 14 and a rotor member 16 which has disposed thereon a field winding 18. A polyphase armature winding 20 is disposed on the stator 14 and is adapted to supply the load conductors 22, 24 and 26.

In order to supply power to the field winding 18 of the turbo-generator 10 a main exciter 28 is provided. The main exciter comprises a rotor member 30 having disposed thereon a three-phase armature 32, the output of which is electrically connected through a three-phase rectifier 34 such as a dry type selenium rectifier to the field winding 18 of the turbo-generator 10. As illustrated, the main exciter 28 also comprises a stator member 36 which has disposed thereon a field winding 38.

For the purpose of supplying energy to the regulating system 12, which will be described hereinafter in greater detail, a pilot exciter 40 is provided. The pilot exciter 40 comprises a stator member 42 having disposed thereon an armature winding 44 which is adapted to be connected to the regulating system 12. The pilot exciter 40 likewise comprises a permanent magnet rotor 46 which is rigidly mounted to the shaft 13 which, as can be seen from the drawing, forms a common shaft for the rotor member 16 of the turbo-generator 10, the selenium rectifier 34, the rotor member 30 of the main exciter 28, and the permanent magnet rotor 46 of the pilot exciter 40. By utilizing the common shaft 13 and providing hollow portions 48 for the shaft 13 a completely brushless excitation system is secured.

Most modern turbo-generators are hydrogen cooled in order to secure the benefits of the lower windage-losses. Therefore, a gastight housing 50 is provided which is preferably filled with hydrogen, the gastight housing 50 completely enclosing the turbo-generator 10, the rectifier 34, the main exciter 28, and the pilot exciter 40.

As illustrated, the regulating system 12 comprises a voltage reference network, indicated generally at 52, which is responsive to the output of the turbo-generator 10, a regulating magnetic amplifier, indicated generally at 54, whose input is responsive to the output of the voltage reference network 52, and a main magnetic amplifier, indicated generally at 56, whose input is responsive to the output of the regulating magnetic amplifier 54 and whose output is electrically connected to the field winding 38 of the main exciter 28 so as to produce a voltage across the field winding 38 that is proportional to the magnitude of the output voltage of the turbo-generator 10.

In order to produce an input voltage to the regulating magnetic amplifier 54 that is independent of the frequency of the turbo-generator 10 and independent of the temperature of the air in contact with the regulating system 12, the voltage reference network 52 is provided. The voltage reference network 52 comprises a full-wave dry type rectifier 60, a saturable reactor 61, and another dry type full-wave rectifier 62. As can be seen from the drawing, the saturable reactor 61 comprises alternating current windings 64 and 66 which are disposed around a magnetic core member 68 so as to produce a flux which is additive around the core member 68. In order to produce an absolutely constant biasing flux for the core member 68 and magnetize it a predetermined amount, a permanent bar magnet 70 is associated with the core member 68. When the magnet 70 is so disposed the current flow through the alternating current windings 64 and 66 is substantially constant over wide changes in the magnitude and frequency of the output voltage of the turbo-generator 10. This action can be explained by considering that a family of hysteresis curves for the core member 68 will be produced if the magnitude of the bias on the core member 68 is varied. Each of the curves of this family of curves has a substantially vertical portion. Therefore, if the bias on the core member 68 is absolutely constant, only one hysteresis curve will be produced for the given constant bias and since the operation takes place on the vertical portion of the hysteresis curve, the output current from the alternating current windings 64 and 66 will remain substantially constant over wide changes in the magnitude and frequency of the output voltage of the turbo-generator 10. In addition, the output current from the alternating current windings 64 and 66 is substantially constant over wide changes in the temperature of the air surrounding the saturable reactor 61 since the alternating current windings 64 and 66 constitute primarily a reactive impedance.

As can be seen from the drawing, the alternating current windings 64 and 66 of the saturable reactor 61 are connected in series circuit relation with a variable resistance member 76, in order to provide a voltage across the resistance member 76 and thus a voltage across the input terminals of the rectifier 62 which is substantially independent of changes in the magnitude and frequency of the output voltage of the turbo-generator 10, and of changes in the temperature of the surrounding air. The series circuit comprising the resistance member 76 and the alternating current windings 64 and 66 is electrically connected to the line conductors 24 and 26 through a potential transformer 78, having a secondary winding 80. It is of course to be understood that the alternating current windings 64 and 66 could just as well receive their energy from a separate source of alternating current energy (not shown).

In order to provide a voltage across the input terminals of the rectifier 60 that is proportional to the output voltage of the turbo-generator 10, the input terminals of the rectifier 60 are electrically connected through a potential transformer 82 to the secondary winding 80 of the potential transformer 78. Resistance members 84 and 86 are electrically connected across the output terminals of the rectifier 60 and 62, respectively, and are so connected in circuit relation with one another as to produce a combined potential across them which is indicative of whether the output voltage of the turbo-generator 10 is above or below its regulated value.

As illustrated, the regulating magnetic amplifier 54 is provided in order to amplify the output signal of the voltage reference network 52 which appears across the resistance members 84 and 86. The regulating magnetic amplifier 54 comprises magnetic core members 88 and 90 which have disposed thereon control windings 92 and 94, respectively, which are connected in series circuit relation with terminals 95 and 95' across the resistance members 84 and 86 so as to be responsive to the output voltage of the voltage reference network 52. Alternating current or reactor windings 96 and 98 are likewise disposed around the core windings 88 and 90, respectively, and are electrically connected through a full wave dry type rectifier 101 to the secondary winding 80 of the potential transformer 78 by means of line conductors 100 and 100' so as to produce at the output terminals of the rectifier 101 an amplified direct current voltage which is proportional to the magnitude of the deviation of the output voltage of the turbo-generator 10 from its regulated value.

In accord with common practice, rectifiers 102 and 104 are connected in series circuit relation with the alternating current windings 96 and 98, respectively, and so disposed as to alternately permit the passage of current in one direction only through the windings 96 and 98, respectively. Thus there is no current flow through the winding 96 when current is flowing in the winding 98 and no current flows through the winding 98 when current is flowing through the winding 96. Damping windings 99 and 99' are likewise disposed around the core members 88 and 90, respectively, and are so wound thereon that when energized they will produce a flux that opposes the flux produced by the control windings 92 and 94, to thus prevent hunting in the system. The manner in which the damping windings 99 and 99' are electrically connected in the regulating system 12 will be described hereinafter.

As hereinbefore mentioned, the main magnetic amplifier 56 is responsive to the output voltage of the regulating magnetic amplifier 54, which output voltage appears across the output terminals of the rectifier 101. The main magnetic amplifier 56 comprises magnetic core members 110 and 112 which have disposed thereon control windings 114 and 116 which are connected in series circuit relation across the output terminals of the rectifier 101. Alternating current or reactor windings 118 and 120 are also disposed on the core members 110 and 112, respectively.

Rectifiers 122 and 124 are connected in series circuit relation with the alternating current windings 118 and 120, respectively, the alternating current windings 118 and 120 being disposed to receive alternating current energy from the armature winding 44 of the exciter 40. The rectifiers 122 and 124 are disposed to alternately permit the passage of current in one direction only through the windings 118 and 120, respectively. Thus, when current is flowing through the winding 118, no current is flowing through the winding 120 and when current is flowing through the winding 120, no current is flowing through the winding 118. In order to obtain a direct current output from the main magnetic amplifier 56, the alternating current windings 118 and 120 and their series connected rectifiers 122 and 124, respectively, are connected in parallel circuit relation, the parallel circuit in turn being connected across the armature winding 44 of the exciter 40 through a full wave dry type rectifier 126. The output terminals of the rectifier 126 are electrically connected across the field winding 38 of the main exciter 28 through a resistance member 130 so as to provide a voltage across the field winding 38 that is a measure of the magnitude of the output voltage of the turbo-generator 10. The damping windings 99 and 99′ hereinbefore referred to are electrically connected across the resistance member 130 through a potential transformer 132.

In operation the saturable reactor 61 produces a substantially constant direct current voltage across the resistance member 86 which is substantially independent of the magnitude and frequency of the voltage output of the turbo-generator 10, and substantially independent of the temperature of the air in contact with the regulating system 12. When the output voltage of the turbo-generator 10 is at its regulated value, the voltage appearing across the resistance member 84 is such that when combined with that voltage appearing across the resistance member 86, the output to the control windings 92 and 94 of the control magnetic amplifier 54 is of zero magnitude. However, assuming that the output voltage of the turbo-generator 10 tends to increase to a value above its regulated value the voltage appearing across the resistance member 84 will be such as to produce a voltage across the resistance members 84 and 86 of such polarity as to produce a current flow through the control windings 92 and 94 in a direction to decrease the saturation of the core members 88 and 90, respectively. The decrease in saturation of the core members 88 and 90 effects an increase in the impedance of the alternating current windings 96 and 98, respectively. This in turn decreases the input to the rectifier 101 and thus the voltage that appears across its output terminals.

Since the control windings 114 and 116 of the main magnetic amplifier 56 are responsive to the voltage appearing across the output terminals of the rectifier 101, the current flow therethrough will be decreased. As was the case with respect to the amplifier 54, the saturation of the core members 110 and 112 of the amplifier 56 will be decreased. The decrease in saturation of the core members 110 and 112 will effect an increase in the impedance of the alternating current windings 118 and 120, thus decreasing the input to the rectifier 126. The latter decrease will lower the voltage appearing across the field winding 38 of the main exciter 28, thus decreasing the output from the armature winding 32. Since the field winding 18 of the turbo-generator 10 is responsive to the output of the armature winding 32, the voltage appearing across the field winding 18 will be decreased sufficiently to return the output voltage of the turbo-generator 10 to its regulated value.

Assuming the output voltage of the turbo-generator 10 tends to decrease to a value below its regulated value, the voltage appearing across the resistance member 84 will be such as to produce a polarity across the resistance members 84 and 86 combined that will effect a current flow through the control windings 92 and 94 of the control magnetic amplifier 54 in such a direction as to increase the saturation of the core members 88 and 90, respectively. The increased saturation of the core members 88 and 90 effects a decrease in the impedance of the alternating current windings 96 and 98, respectively, thus increasing the output of the control magnetic amplifier 54 and the voltage appearing across the input terminals to the rectifier 101.

Since there is an increase in the voltage appearing across the input terminals to the rectifier 101, its output to the control windings 114 and 116 of the main magnetic amplifier 56 is increased. Such an increase in the current flow through the control windings 114 and 116 effects an increase in the saturation of the core members 110 and 112, respectively, thus increasing the current flow through the alternating current windings 118 and 120, respectively. This effects an increase in the voltage appearing across the input and output terminals of the rectifier 126 and thus the output from the armature winding 32 of the main exciter 28. Since the field winding 18 of the turbo-generator 10 is responsive to the output of the armature winding 32, the voltage appearing across the field winning 18 is increased accordingly. The increase in voltage appearing across the field winding 18 returns the output voltage of the turbo-generator 10 to its regulated value.

Referring to Fig. 2 of the drawing, there is illustrated a modification of the voltage reference network 52 shown in Fig. 1. However, the voltage reference network illustrated in Fig. 2 is not affected by high transient currents appearing across its input since the voltage reference network is responsive to the average three-phase voltage.

For the purpose of simplifying the drawing, the turbo-generator 10, the main exciter 28, the pilot exciter 40, and a portion of the regulating system 12 is not illustrated in Fig. 2, it being understood that this part of the apparatus is identical for both Figs. 1 and 2. It is to be noted that the components of the regulating system 12 which are common to the apparatus shown in Figs. 1 and 2 are designated by the same numerals and the voltage reference network of Fig. 2 is disposed to be connected to the terminals 95 and 95′ of Fig. 1, the conductors 100 and 100′ of Fig. 2 corresponding to the conductors 100 and 100′ of Fig. 1.

In order to produce a voltage across section A of a resistance member 210 that is a measure of the average three-phase voltage appearing at the output of the turbo-generator 10, a three-phase dry type rectifier 212, whose input is responsive to the three-phase output voltage of the turbo-generator 10, has its output terminals connected across the section A.

When the output voltage of the turbo-generator 10 is at its regulated value, the voltage appearing across section A of the resistance member 210 is equal to the substantially constant voltage appearing across section B of the resistance member 210. The voltage across section B of the resistance member 210 is produced by the saturable reactor 61 which is responsive to the voltage across the load conductors 22 and 24 and is connected in circuit relation with the input terminals of the rectifier 62. However, assuming that the output voltage of the turbo-generator 10 tends to increase to a value above its regulated value of the voltage across the section A of the resistance member 210 is greater than the voltage appearing across section B of the resistance member 210. As a result, there is a combined voltage appearing across the resistance member 210 which is of such polarity as to return the output voltage of the turbo-generator 10 to its regulated value as explained with reference to Fig. 1.

Assuming the output voltage of the turbo-generator 10 tends to decrease to a value below its regulated value, the voltage appearing across section A of the resistance member 210 will be of smaller magnitude than the voltage appearing across section B of the resistance member 210. As a result, there will be a combined voltage appearing across the resistance member 210 of such polarity as to increase the output of the turbo-generator 10 to its regulated value.

The apparatus embodying the teachings of this invention has many advantages. Among these advantages is the fact that the voltage reference network 52 and the voltage reference network illustrated in Fig. 2 are substantially insensitive to changes in magnitude and frequency of the output voltage of the turbo-generator 10 and to changes in the temperature of the air in contact with the voltage reference networks. In addition, by utilizing magnetic amplifiers in conjunction with the remainder of the apparatus a high speed of response is obtained, which high speed of response greatly decreases the percentage of regulation error.

We claim as our invention:

1. In a voltage reference network disposed to be responsive to a variable alternating current voltage, the combination comprising, a full wave dry type rectifier having input and output terminals, means for applying the variable alternating current voltage across the input terminals of the full wave rectifier, another full wave dry type rectifier having input and output terminals, a saturable reactor comprising a magnetic core member and a permanent magnet so disposed as to magnetize the core member a predetermined amount, the saturable reactor being responsive to the variable alternating current voltage and so disposed as to produce across the input terminals of said another rectifier a voltage that is substantially independent of the frequency and magnitude of the variable alternating current voltage, and circuit means associated with said full wave rectifier and said another full wave rectifier so as to produce a combined output voltage from said rectifier and said another rectifier that is a measure of the difference between the voltage across the input terminals of said rectifier and the voltage appearing across the input terminals of said another rectifier.

2. In a voltage reference network disposed to be responsive to a variable alternating current voltage, the combination comprising, a full wave dry type rectifier having input and output terminals, means for applying the variable alternating current voltage across the input terminals of the full wave rectifier, another full wave dry type rectifier having input and output terminals, a saturable reactor comprising a magnetic core member and a permanent magnet so disposed as to magnetize the core member a predetermined amount, the saturable reactor being responsive to another variable alternating current voltage and so disposed as to produce across the input terminals of said another rectifier a voltage that is substantially independent of the frequency and magnitude of the variable alternating current voltage, and circuit means associated with said full wave rectifier and said another full wave rectifier so as to produce a combined output voltage from said rectifier and said another rectifier that is a measure of the difference between the voltage across the input terminals of said rectifier and the voltage appearing across the input terminals of said another rectifier.

3. In a voltage reference network disposed to be responsive to a variable alternating current voltage, the combination comprising, a full wave dry type rectifier having input and output terminals, a resistance member disposed across the output terminals of the full wave dry type rectifier, another full wave dry type rectifier having input and output terminals, another resistance member disposed across the output terminals of said another full wave dry type rectifier, circuit means for applying a voltage across the input terminals of said full wave dry type rectifier that is a measure of the variable alternating current voltage, a saturable reactor comprising a magnetic core member and a permanent bar magnet so disposed as to magnetize the core member a predetermined amount, the saturable reactor being responsive to the variable alternating current voltage and so disposed as to produce a constant alternating current voltage across the input terminals of said another full wave dry type rectifier that is substantially independent of changes in magnitude and frequency of the variable alternating current voltage, and circuit means electrically connected between one of the output terminals of said full wave dry type rectifier and one of the output terminals of said another full wave dry type rectifier so as to produce at the other two remaining output terminals of said full wave dry type rectifier and said another full wave dry type rectifier a voltage that is a measure of the difference of the voltage appearing across said resistance member and said another resistance member.

4. In a voltage reference network responsive to a variable alternating current voltage, the combination comprising, a full wave dry type rectifier having input and output terminals, a resistance member disposed across the output terminals, circuit means for applying to the input terminals a voltage that is a measure of the variable alternating current voltage, another full wave dry type rectifier having input and output terminals, another resistance member connected across the output terminals of said another rectifier, still another resistance member connected across the input terminals of said another rectifier, a saturable reactor comprising a magnetic core member, a permanent magnet so disposed as to magnetize the core member a predetermined amount, and alternating current windings connected in series circuit relation with said still another resistance member so as to be responsive to said variable alternating current voltage, and circuit means connected to one of the output terminals of said rectifier and one of the output terminals of said another rectifier so as to produce an output voltage at the other two output terminals of said rectifier and said another rectifier that is a measure of the difference between the voltage appearing across said resistance member and said another resistance member.

5. In a voltage reference network disposed to be responsive to a variable three-phase alternating current voltage, the combination comprising, a three-phase dry type rectifier having input and output terminals, circuit means for applying the variable three-phase alternating current voltage to the input terminals of the three-phase rectifier, a full wave dry type rectifier having input and output terminals, a saturable reactor comprising a magnetic core member and a permanent magnet so disposed as to magnetize the core member a predetermined amount, the saturable reactor being electrically connected in circuit relation with the input terminals of the full wave rectifier and disposed to be responsive to another alternating current voltage, and circuit means electrically connected to the output terminals of the three-phase dry type rectifier and the full wave dry type rectifier for producing a direct current voltage which is a measure of the difference between the voltage appearing across the input terminals of the three-phase dry type rectifier and the full wave dry type rectifier.

6. In a voltage reference network disposed to be responsive to a variable three-phase alternating current voltage, the combination comprising, a three-phase dry type rectifier having input and output terminals, circuit means for applying the variable three-phase alternating current voltage to the input terminals of the three-phase rectifier, a full wave dry type rectifier having input and output terminals, a saturable reactor comprising a magnetic core member and a permanent magnet so disposed as to magnetize the core member a predetermined amount, the saturable reactor being electrically connected in circuit relation with the input terminals of the full wave rectifier and disposed to be responsive to one of the three alternating current phases, a resistance member comprising two sections, another circuit means for electrically connecting the output terminals of the three-phase dry type rectifier across one section of the resistance member, and still another circuit means for electrically connecting the output terminals of the full wave rectifier across the other section of the resistance member so as to produce a voltage across the resistance member that is a measure of the difference between the voltage appearing across the input terminals of the three-phase rectifier and across the input terminals to the full wave rectifier.

7. In a regulating system for maintaining the output voltage of an alternating current generator having a field winding substantially constant, the combination comprising, a voltage reference network disposed to be responsive to the alternating current output voltage, said voltage reference network comprising, a full wave dry type rectifier having input and output terminals, a resistance member disposed across the output terminals of the full wave dry type rectifier, means for applying the alternating current voltage across the input terminals of the full wave rectifier, another full wave dry type rectifier having input and output terminals, another resistance member disposed across the output terminals of said another rectifier, a saturable reactor comprising a magnetic core member and a permanent magnet so disposed as to magnetize the core member a predetermined amount, the saturable reactor being responsive to the alternating current voltage and so disposed as to produce across the input terminals of said another rectifier a voltage that is substantially independent of the frequency and magnitude of the alternating current voltage, and circuit means associated with said full wave rectifier and said another full wave rectifier so as to produce a combined output voltage from said rectifier and said another rectifier that is a measure of the difference between the voltage across said resistance member and the voltage appearing across said another resistance member, and magnetic amplifier means responsive to the voltage appearing across said resistance member and said another resistance member combined, said magnetic amplifier means being disposed to vary the voltage appearing across said generator field winding and thus return the output voltage of the generator to its regulated value.

8. In a regulating system for maintaining the output voltage of an alternating current generator having a field winding substantially constant, the combination comprising, a voltage reference network disposed to be responsive to the alternating current output voltage, said voltage reference network comprising, a full wave dry type rectifier having input and output terminals, means for applying the alternating current voltage across the input terminals of the full wave rectifier, another full wave dry type rectifier having input and output terminals, a saturable reactor comprising a magnetic core member and a permanent magnet so disposed as to magnetize the core member a predetermined amount, the saturable reactor being responsive to another alternating current voltage and so disposed as to produce across the input terminals of said another rectifier a voltage that is substantially independent of the frequency and magnitude of the alternating current voltage, and circuit means associated with said full wave rectifier and said another full wave rectifier so as to produce a combined output voltage from said rectifier and said another rectifier that is a measure of the difference between the voltage across the input terminals of said rectifier and the voltage appearing across the input terminals of said another rectifier.

9. In a regulating system for maintaining the output voltage of an alternating current generator having a field winding substantially constant, the combination comprising, a voltage reference network responsive to the alternating current output voltage, said voltage reference network comprising, a full wave dry type rectifier having input and output terminals, a resistance member disposed across the output terminals, circuit means for applying to the input terminals a voltage that is a measure of the variable alternating current voltage, another full wave dry type rectifier having input and output terminals, another resistance member connected across the output terminals of said another rectifier, still another resistance member connected across the input terminals of said another rectifier, a saturable reactor comprising a magnetic core member, a permanent magnet so disposed as to magnetize the core member a predetermined amount, and alternating current windings connected in series circuit relation with said still another resistance member so as to be responsive to said alternating current voltage, and circuit means connected to one of the output terminals of said rectifier and one of the output terminals of said another rectifier so as to produce an output voltage at the other two output terminals of said rectifier and said another rectifier that is a measure of the difference between the voltage appearing across said resistance member and said another resistance member, and magnetic amplifier means responsive to the voltage appearing across said resistance member and said another resistance member combined, said magnetic amplifier means being disposed to vary the voltage appearing across said generator field winding and thus return the output voltage of the generator to its regulated value.

10. In a voltage regulating system for maintaining the three-phase output voltage of an alternating current generator having a field winding substantially constant, the combination comprising, a voltage reference network comprising, a three-phase dry type rectifier having input and output terminals, circuit means for applying the three-phase alternating current voltage to the input terminals of the three-phase rectifier, a full wave dry type rectifier having input and output terminals, a saturable reactor comprising a magnetic core member and a permanent magnet so disposed as to magnetize the core member a predetermined amount, the saturable reactor being electrically connected in circuit relation with the input terminals of the full wave rectifier and disposed to be responsive to one of the three alternating current phases, a resistance member comprising two sections, another circuit means for electrically connecting the output terminals of the three-phase dry type rectifier across one section of the resistance member, and still another circuit means for electrically connecting the output terminals of the full wave rectifier across the other section of the resistance member so as to produce a voltage across the resistance member that is a measure of the difference between the voltage appearing across the input terminals of the three-phase rectifier and across the input terminals to the full wave rectifier, and magnetic amplifier means responsive to the voltage across the resistance member and so disposed as to vary the voltage across said generator field winding to thus return the generator output voltage to its regulated value.

EDWIN L. HARDER.
SCHUYLER L. BRADLEY.

No references cited.